Aug. 10, 1954
C. J. MILLER
AMPLIFIER
Filed March 28, 1950
2,686,258
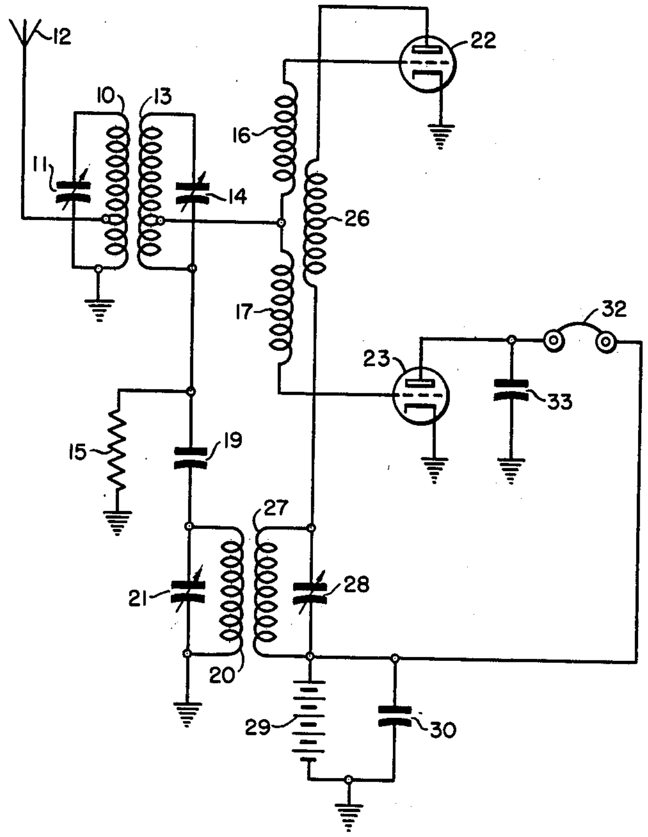
WITNESSES:
Robert O. Baird
Wm. C. Groome
INVENTOR
Coleman J. Miller.
BY F. E. Browder
ATTORNEY Patented Aug. 10, 1954

2,686,258

UNITED STATES PATENT OFFICE 2,686,258

AMPLIFIER

Coleman J. Miller, Catonsville, Md., assignor to Westinghouse Electric Corporation, East Pittsburgh, Pa., a corporation of Pennsylvania Application March 28, 1950, Serial No. 152,361

14 Claims. (Cl. 250—20)

This invention relates to super-regenerative amplifiers for radio receivers.

Super-regenerative amplifiers have the advantages of providing high gain economically with but small space and weight requirements. The super-regenerative amplifiers which have been used in the past, have however, had the disadvantages of re-radiating energy from the receiving antennas, and of having poor sensitivity and selectivity. Prior attempts to reduce such re-radiation have not been successful for when re-radiation was reduced, the amplification was reduced.

This invention provides a super-regenerative amplifier which is more sensitive and selective than prior super-regenerative amplifiers and which reduces the amount of energy radiated to a minimum. This is accomplished by isolating the antenna and oscillator plate circuits by a bridge circuit connected therebetween.

An object of the invention is to reduce the energy re-radiated from an antenna connected to a super-regenerative amplifier.

Another object of the invention is to increase the selectivity of a super-regenerative amplifier.

Another object of the invention is to increase the sensitivity of a super-regenerative amplifier.

The invention will now be described with reference to the drawing which is a circuit schematic illustrating one embodiment of the invention.

The tuning coil 10, shunted by the variable capacitor 11, has one end grounded and has a tap near that end to which is connected the antenna 12. The tuning coil 13 shunted by the variable capacitor 14 is inductively coupled to the coil 10, and has one end connected through the grid resistor 15 to ground, and has a tap near that end, connected to the mid-point connection of the series-connected, grid coils 16 and 17. The end of the coil 13 which is connected to the resistor 15 is connected through the grid capacitor 19 to one end of the tuning coil 20, the other end of which is grounded. The variable capacitor 21 is shunted across the coil 20.

The outer end of the coil 16 is connected to the control grid of the amplifier tube 22, and the outer end of the coil 17 is connected to the control grid of the detector tube 23. The resistor 15 provides bias for the control grids of the tubes 22 and 23. The cathodes of the tubes 22 and 23 are grounded.

The plate of the tube 22 is connected to one end of the feed-back coil 26, the other end of which is connected through the tuning coil 27, shunted by the variable capacitor 28, to the positive terminal of the plate voltage source 29, which is shunted by the capacitor 30, and the negative terminal of which is grounded.

The tuning coil 27 is inductively coupled to the tuning coil 20, both coils being tuned to the squelch frequency. The feed-back coil 26 is inductively coupled to the grid coils 16 and 17.

The plate of the detector tube 23 is connected through the ear-phones 32 to the positive terminal of the source 29, and through the by-pass capacitor 33 to ground.

The coils 10 and 13 with their tuning capacitors 11 and 14 respectively, provide a sharply-tuned circuit providing selectivity in the antenna circuit.

The coils 16 and 17 are tuned to the operating frequency by the input capacity of the tubes 22 and 23.

The feed-back coil 26 is coupled to the grid coils 16 and 17 to feed energy from the plate circuit of the tube 22 to the grids of the tubes 22 and 23. These grids are in push-pull as far as this energy is concerned so that when the two grid circuits are properly balanced, no voltage is present at the junction point of the coils 16 and 17 to feed energy into the antenna circuit.

The oscillator circuit must have poor selectivity just as in a conventional super-regenerative circuit in order that the energy stored in the circuit may be dissipated substantially completely during the time the oscillator is turned off by the squelch circuit. However, by isolating the antenna and the plate circuit of the oscillator as illustrated by the drawing, the sharply tuned selectivity providing circuit comprising the coils 10 and 13 and their tuning capacitors 11 and 14 respectively, can be added. This not only improves the selectivity, but the sensitivity as well.

The tube 23 performs in addition to its function as a detector, that of balancing the bridge including the tube 22 and the coils 16 and 17. This tube could be another amplifier tube and function in the same way to balance the bridge circuit.

In operation, the tube 22 operates as a conventional super-regenerative amplifier in that regeneration is periodically stopped by squelch oscillations from the squelch oscillator circuit including the coil 20, the grid resistor 15 and capacitor 19, and the tube 22. Feed-back from the plate of the tube 22 to its grid is provided through the inductively coupled plate coil 26 and grid coil 16. Signals from the antenna circuit reach the grid of the tube 22 through the coil 16.

Energy from the feed-back coil 26 is supplied to the grid of the tube 23 through the coupling of the coil 26 to the grid coil 17.

However, energy fed back from the coil 26 to the coil 16 or the coil 17 when the bridge circuit including the coils 16 and 17 and the tubes 22 and 23 is properly balanced, will not reach the antenna, since equal voltages 180° out-of-phase will be present in the coils 16 and 17 and which balance out at the junction point of the coils 16 and 17, which point is the connection to the antenna circuit.

I claim as my invention:

1. A super-regenerative amplifier comprising an amplifier tube having a control electrode and an anode, a circuit comprising a first coil connected at one end to said control electrode, an input circuit directly connected to the other end of said first coil for supplying input signals to said coil, a second coil having one end connected to said other end of said first coil, an output circuit comprising a potential responsive device and a load connected to the other end of said second coil for forming therewith a circuit having substantially the same electrical characteristics as said input circuit, and a feed-back coil connected to said anode and inductively coupled to said first and second coils.

2. An amplifier as claimed in claim 1 in which the output circuit connected to the other end of the second coil includes the control electrode of a second tube.

3. An amplifier as claimed in claim 1 in which the output circuit connected to the other end of the second coil includes the control electrode of a detector tube.

4. A super-regenerative amplifier comprising an amplifier tube having a control grid and an anode, a circuit tuned to the operating frequency of said amplifier and comprising a first coil connected at one end to said grid, an input circuit directly connected to said first coil for supplying input signals at the other end of said coil, a second coil having one end connected to said other end of said first coil, a feed-back coil connected to said anode and inductively coupled to said first and second coils, and an output circuit comprising a potential responsive device and a load connected to the other end of said second coil for forming therewith a circuit tuned to said operating frequency and balanced with said input circuit, whereby energy from said feed-back coil supplied into said circuits balances out at the interconnected coil ends.

5. An amplifier as claimed in claim 4 in which the output circuit connected to the other end of the second coil includes the control grid of a tube.

6. An amplifier as claimed in claim 4 in which the potential responsive device is an electron discharge device having a control grid.

7. A super-regenerative amplifier comprising an amplifier tube having a control grid and an anode, an input circuit tuned to the operating frequency of said amplifier and comprising a first coil connected at one end to said grid, means for supplying input signals to the other end of said coil, a second coil having one end connected to said other end of said first coil, a feed-back coil connected to said anode and inductively coupled to said first and second coils, an output circuit comprising a potential responsive device and a load connected to the other end of said second coil for forming therewith a circuit tuned to said operating frequency and substantially balanced with said input circuit whereby energy from said feed-back coil supplied into said circuits substantially balances out at the interconnected coil ends, a third coil tuned to the squelch frequency connected in series with said feed-back coil, a fourth coil tuned to said squelch frequency and coupled to said third coil, and a grid resistor and condenser for said tube connected to said interconnecter coil ends, and to said fourth coil.

8. An amplifier as claimed in claim 7 in which the output circuit includes the control grid of another tube.

9. An amplifier as claimed in claim 7 in which the output circuit includes the control grid of a detector tube.

10. A super-regenerative amplifier comprising an amplifier tube having a control grid and an anode, an output tube having a control grid, a balanced bridge circuit including said amplifier tube and said output tube and including in one arm a first coil connected at one end to said control grid of said amplifier tube and including in another arm a second coil connected at one end to said control grid of said second tube, the other ends of said coils being interconnected, an input circuit directly connected to said interconnected coil ends for supplying an input signal to said coils, and a feed-back coil connected to said anode and inductively coupled to said first and second coils.

11. A super-regenerative amplifier comprising an amplifier tube having a control grid and an anode, an output tube having a control grid, a balanced bridge circuit including said amplifier tube and said output tube and including in one arm a first coil connected at one end to said control grid of said amplifier tube and including in another arm a second coil connected at one end to said control grid of said second tube, the other ends of said coils being connected, an input circuit comprising a tuned secondary coil directly connected to the interconnected ends of said first and second coils and including a tuned primary coil coupled to said secondary coil, and a feed-back coil connected to said anode and inductively coupled to said first and second coils.

12. A super-regenerative amplifier comprising an amplifier tube having a control grid and an anode, an output tube having a control grid, a balanced bridge circuit including said amplifier tube and said output tube and including in one arm a first coil connected at one end to said grid of said amplifier tube and including in another arm a second coil connected at one end to said grid of said second tube, the other ends of said coils being interconnected, an input circuit comprising a tuned secondary coil connected to the interconnected ends of said first and second coils and including a primary coil coupled to said secondary coil, a feed-back coil connected to said anode and inductively coupled to said first and second coils, a third coil tuned to a squelch frequency connected in series with said feed-back coil, and a fourth coil tuned to said squelch frequency and coupled to said third coil and connected to said secondary coil.

13. A super-regenerative amplifier comprising: a first amplifier tube and a second amplifier tube each having a control electrode and an anode, a first coil and a second coil connected in series between the grid of said first tube and the grid of said second tube, a third coil connected to the anode of said first tube and inductively coupled to said first coil and said second coil so as to induce potentials across said first coil and said second coil of opposite polarity with respect to the junction between those coils in response to a current flowing through said first tube, output connections connected to the anode of said second tube, and an input circuit directly connected to the junction between said first coil and said second coil.

14. Apparatus substantially as described in claim 13, in which said input circuit includes tuning means.

References Cited in the file of this patent

UNITED STATES PATENTS

| Number | Name | Date |
|---|---|---|
| 1,455,768 | Slepian | May 15, 1923 |
| 2,036,690 | George | Apr. 7, 1936 |
| 2,071,950 | Reinartz | Feb. 23, 1937 |
| 2,091,546 | Hruska | Aug. 31, 1937 |